(12) United States Patent
Tomasso

(10) Patent No.: US 11,201,858 B2
(45) Date of Patent: Dec. 14, 2021

(54) APPARATUS AND METHOD FOR SECURE ROUTER DEVICE

(71) Applicant: KCT HOLDINGS, LLC, Turnersville, NJ (US)

(72) Inventor: Keiron Christopher Tomasso, Turnersville, NJ (US)

(73) Assignee: KCT HOLDINGS, LLC, Turnersville, NJ (US)

( * ) Notice: Subject to any disclaimer, the term of this patent is extended or adjusted under 35 U.S.C. 154(b) by 104 days.

(21) Appl. No.: 15/994,469

(22) Filed: May 31, 2018

(65) Prior Publication Data
US 2018/0351924 A1 Dec. 6, 2018

Related U.S. Application Data

(60) Provisional application No. 62/513,853, filed on Jun. 1, 2017.

(51) Int. Cl.
| H04L 29/06 | (2006.01) |
| G06F 9/455 | (2018.01) |
| H04L 12/713 | (2013.01) |
| G06F 8/654 | (2018.01) |

(52) U.S. Cl.
CPC .......... H04L 63/0485 (2013.01); G06F 8/654 (2018.02); G06F 9/45558 (2013.01); H04L 45/586 (2013.01); H04L 63/0478 (2013.01); *G06F 2009/45579* (2013.01); *G06F 2009/45595* (2013.01)

(58) Field of Classification Search
CPC ............... H04L 45/586; H04L 63/0485; H04L 63/0478; G06F 2009/45595; G06F 2009/45579; G06F 8/654; G06F 9/45558
See application file for complete search history.

(56) References Cited

U.S. PATENT DOCUMENTS

| 7,389,534 | B1 * | 6/2008 | He | H04W 12/0013 |
| | | | | 726/15 |
| 2010/0061366 | A1 * | 3/2010 | DelRegno | H04L 49/552 |
| | | | | 370/389 |
| 2010/0299538 | A1 * | 11/2010 | Miller | G06F 21/78 |
| | | | | 713/190 |
| 2015/0281042 | A1 * | 10/2015 | Agarwal | H04L 45/741 |
| | | | | 709/238 |
| 2016/0112495 | A1 * | 4/2016 | Gizis | H04L 67/06 |
| | | | | 709/219 |
| 2017/0005942 | A1 * | 1/2017 | Agarwal | H04L 45/04 |
| 2017/0097842 | A1 * | 4/2017 | Bugenhagen | G06F 9/45558 |
| 2017/0317972 | A1 * | 11/2017 | Bansal | H04L 61/2507 |

* cited by examiner

*Primary Examiner* — Vu V Tran
(74) *Attorney, Agent, or Firm* — Volpe Koenig

(57) ABSTRACT

Method, systems, and devices for providing a multi-function router. A router may receive, process, and forward data packets between a physical network interface and a logical network interface. The router may also run a virtualized machine that uses the logical network interface mapped statically or dynamically to the physical network interface.

19 Claims, 5 Drawing Sheets

APPARATUS AND METHOD FOR SECURE ROUTER DEVICE

CROSS REFERENCE TO RELATED APPLICATIONS

This application claims the benefit of U.S. Provisional Application No. 62/513,853 filed on Jun. 1, 2017, which are incorporated by reference as if fully set forth.

FIELD OF INVENTION

The present application is directed to networking and electronic secure communication using a router.

BACKGROUND

The concept of a router has been employed in some of the first known versions of computer networking. Routers relate to intelligent decision making for deciding where packets should be sent based on a specified protocol. A router is typically connected to a network, such as the internet or a local area network. A need may arise for a multi-function router device that provides functionality beyond what is currently available.

SUMMARY

Method, systems, and devices for providing a multi-function router. A router may receive, process, and forward data packets between a physical network interface and a logical network interface. The router may also run a virtualized machine that uses the logical network interface mapped statically or dynamically to the physical network interface.

DETAILED DESCRIPTION

The present application is written with various examples, embodiments, scenarios, and situations that are meant to present non-limiting exemplary descriptions of the present application. Further, it is envisioned that any of the examples, embodiments, scenarios, or situations may be used separately, combined, or in any possible configuration as may be possible despite the description herein.

In the normal course of business or personal use, there may arise a situation where one person(s) needs to communicate data to another person(s) in a remote location. For example, a first person in a first location may need to communicate information securely to a second person in a second location. One approach may be to encrypt the data using a specialized router at both ends, thereby creating a secure tunnel between the first person and the second person. In order to increase the security, however, it may be advantageous to increase the layers by offering, for example, two encryptions by two router services. There may be a need for a router device that can provide a solution to sending information securely leveraging layered encryption from one computing device to another at a remote location to provide adequate protection of the information.

Figure 1:
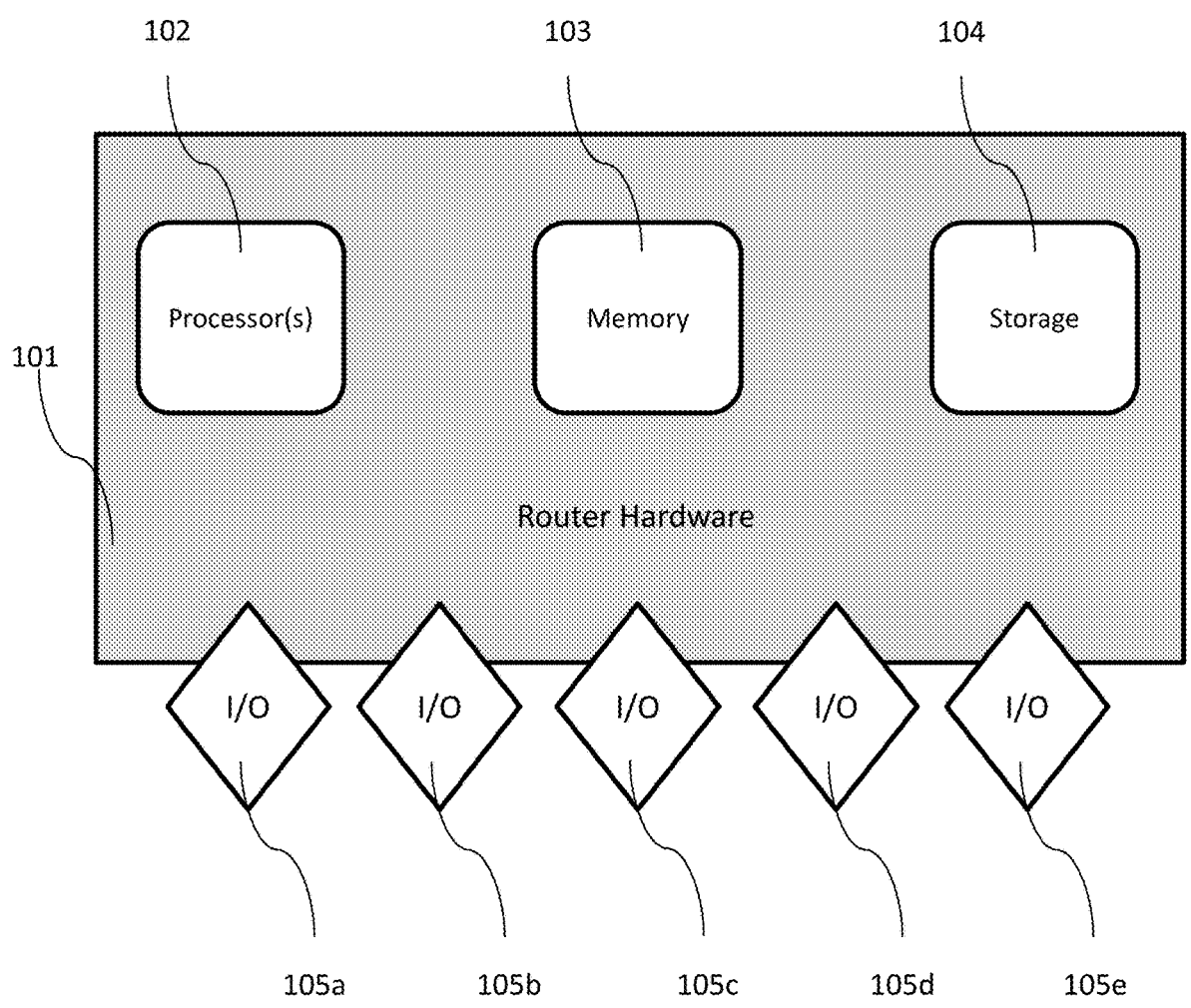
FIG. 1 shows an example of the hardware of a router device.

FIG. 1 shows an example router. The router 101 may have one or more hardware components such as one or more processors 102 and/or microcontrollers operatively connected to memory and/or computer readable storage media 103, 104 and a physical interface. Examples of memory and computer-readable storage media include, but are not limited to, a read only memory (ROM), a random access memory (RAM), a register, cache memory, semiconductor memory devices, magnetic media such as internal hard disks and removable disks, storage mediums, spinning hard drives, solid state drives, magneto-optical media, and optical media such as CD-ROM disks, and digital versatile disks (DVDs). The memory 103 may contain computer code that may be executed by the processor and utilize the hardware of the router 101. The physical interface may have one or more I/O ports 105 such as: a USB port (e.g., USB 1.0, 2.0, 3.0, 3.1, etc.), a serial port (e.g., RS-232), parallel port, Small Computer Systems Interface port (SCSI), FireWire (i.e., IEEE 1394), Thunderbolt (e.g., Thunderbolt 1, 2, 3), Peripheral Component Interconnect (PCI), PCI express (PCIe), Coaxial port, network interface controller (NIC) (e.g., Ethernet RJ-45), modem port (i.e., telephone jack RJ-11), wireless card (e.g., WIFI IEEE 802.11 standards, Bluetooth, NFC, cell phone modem based on 3GPP standards, etc.), optical data port (e.g., laser, infrared, etc.), audio ports, display ports (e.g., HDMI, VGA, DisplayPort, etc.), and human interface ports (e.g., keyboard, mouse, PS/2, etc.). For example, a networking port may be an Ethernet port. There may be multiple iterations of one type of port, such as a set of networking ports which include at least two Ethernet ports. A set of networking ports may comprise a set of the same type or different types of ports.

Figure 2:
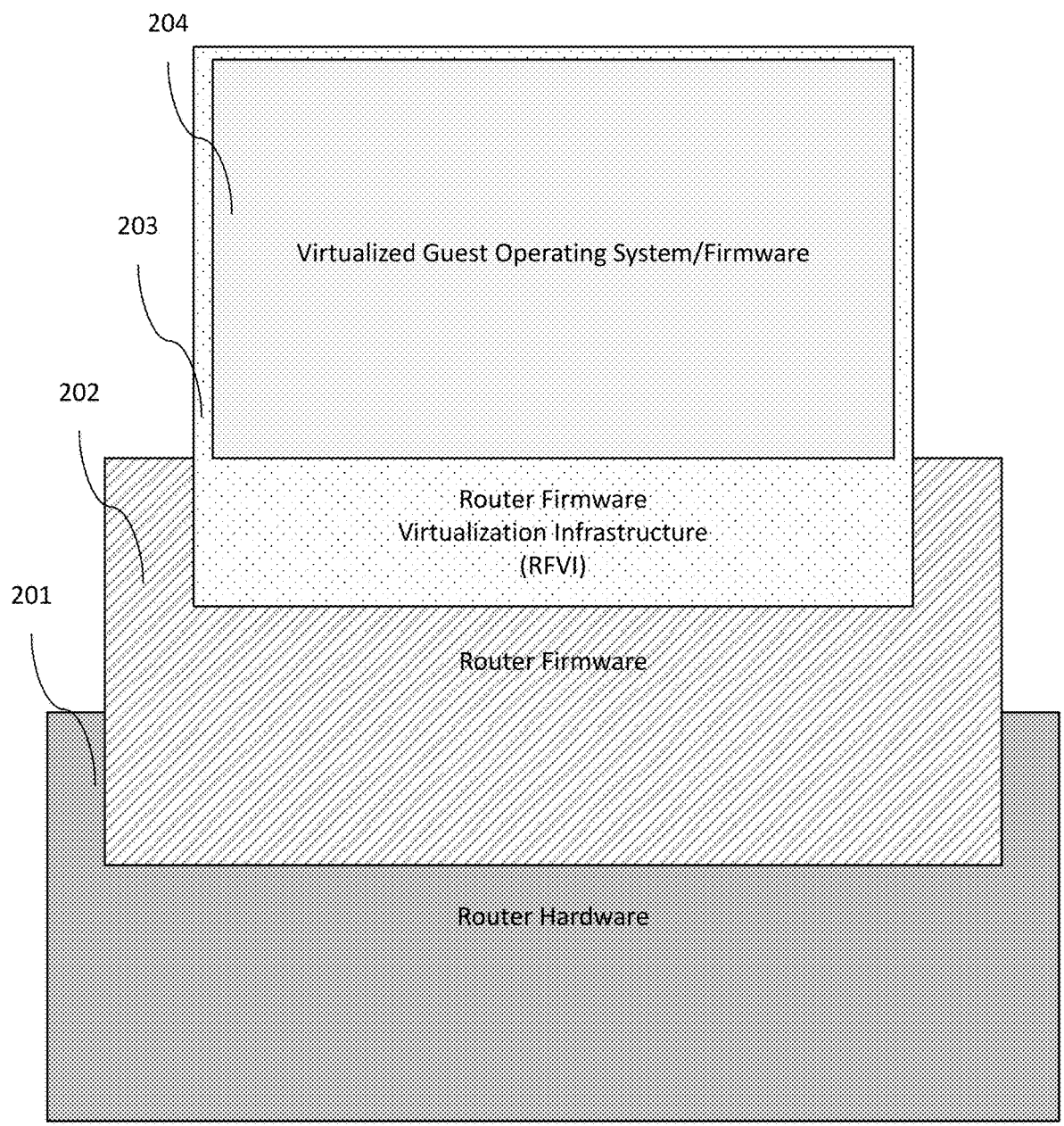
FIG. 2 shows a high level diagram of an example router configuration.

FIG. 2 shows a high level diagram of an example router configuration. In one embodiment the router hardware 201 may run router firmware 202, software 203, operating systems (OS) 204, and/or applications. The router 201 may run firmware 202 that supports/enables/executes router firmware virtualization infrastructure (RFVI) 203 that creates one or more virtualized environments 204. The RFVI 203 may support/enable/execute one or more virtual machines 204 such as a virtualized guest operating system (OS), firmware, and/or software. The virtual machine 204 may be an operating system based on Microsoft Windows, Linux, Unix, MacOS, or the like. In one example the virtual machine 204 may be a software OS performing the role of a Domain Controller. In one example the RFVI 203 may be an application specific server. The operating system 204 may run software that performs specific functionalities and/or emulates the functionality of a specialized device, such as a virtual server or router. The router 201 and/or virtual server 204 may be connected to one or more logical or physical networks, such as the internet, and may assist in the management and/or forwarding of data packets within and/or between networks, and/or virtual machines, and or hardware.

Figure 3:
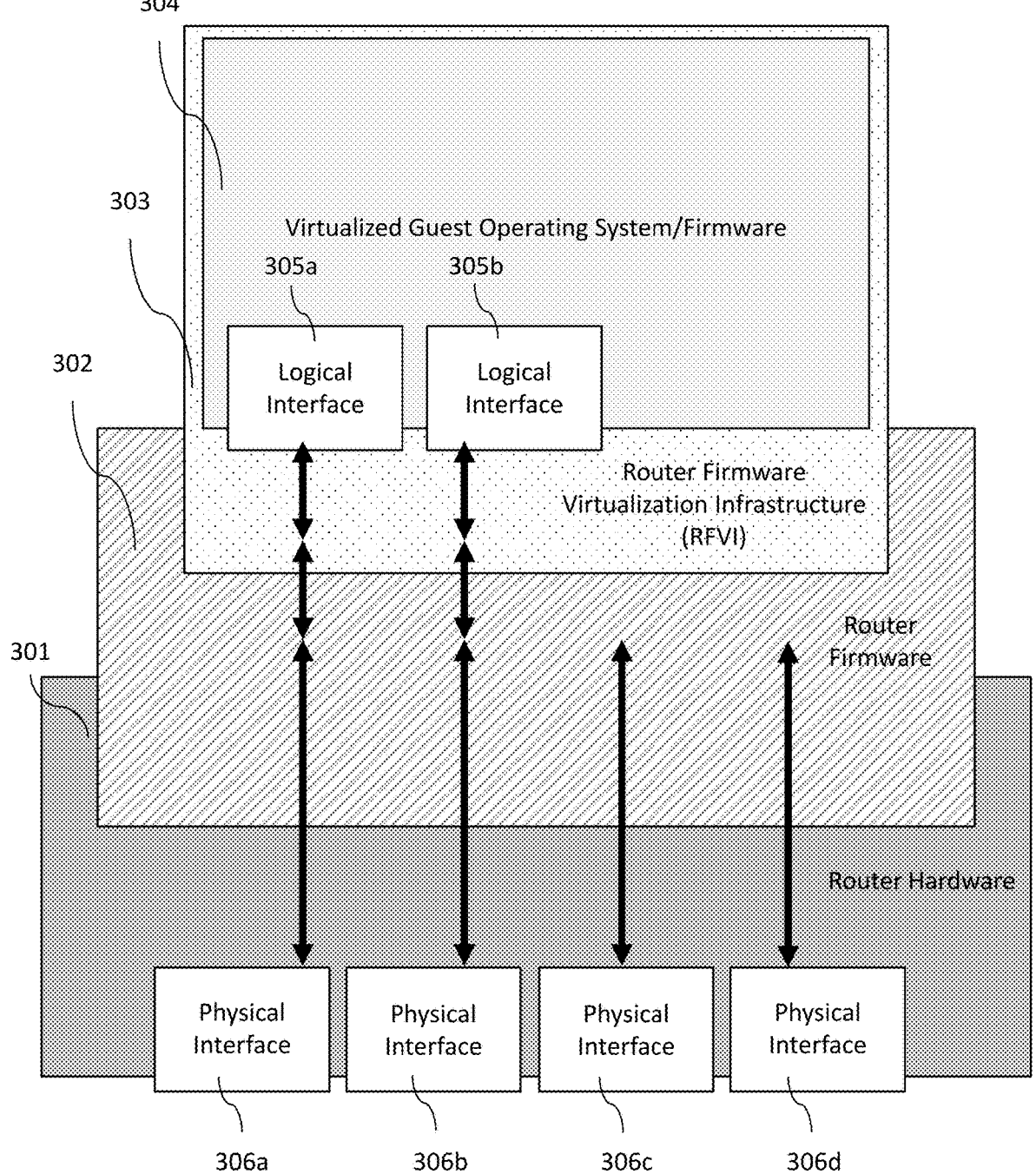
FIG. 3 shows a high level diagram of an example router configuration.

FIG. 3 shows a high level diagram of an example router configuration. In one embodiment the one or more virtual machines 304 may have virtual interfaces, also known as logical interfaces 305, connected to the physical interfaces 306, as described herein. The RFVI 301 via the router firmware 302 may facilitate a connection between the logical interface 305 and the physical interface 306. The logical interface 305 may include a virtualized version of physical interface ports 306. Additionally/alternatively, the virtual machine logical interface 305 may connect with a host router firmware logical interface.

Figure 4:
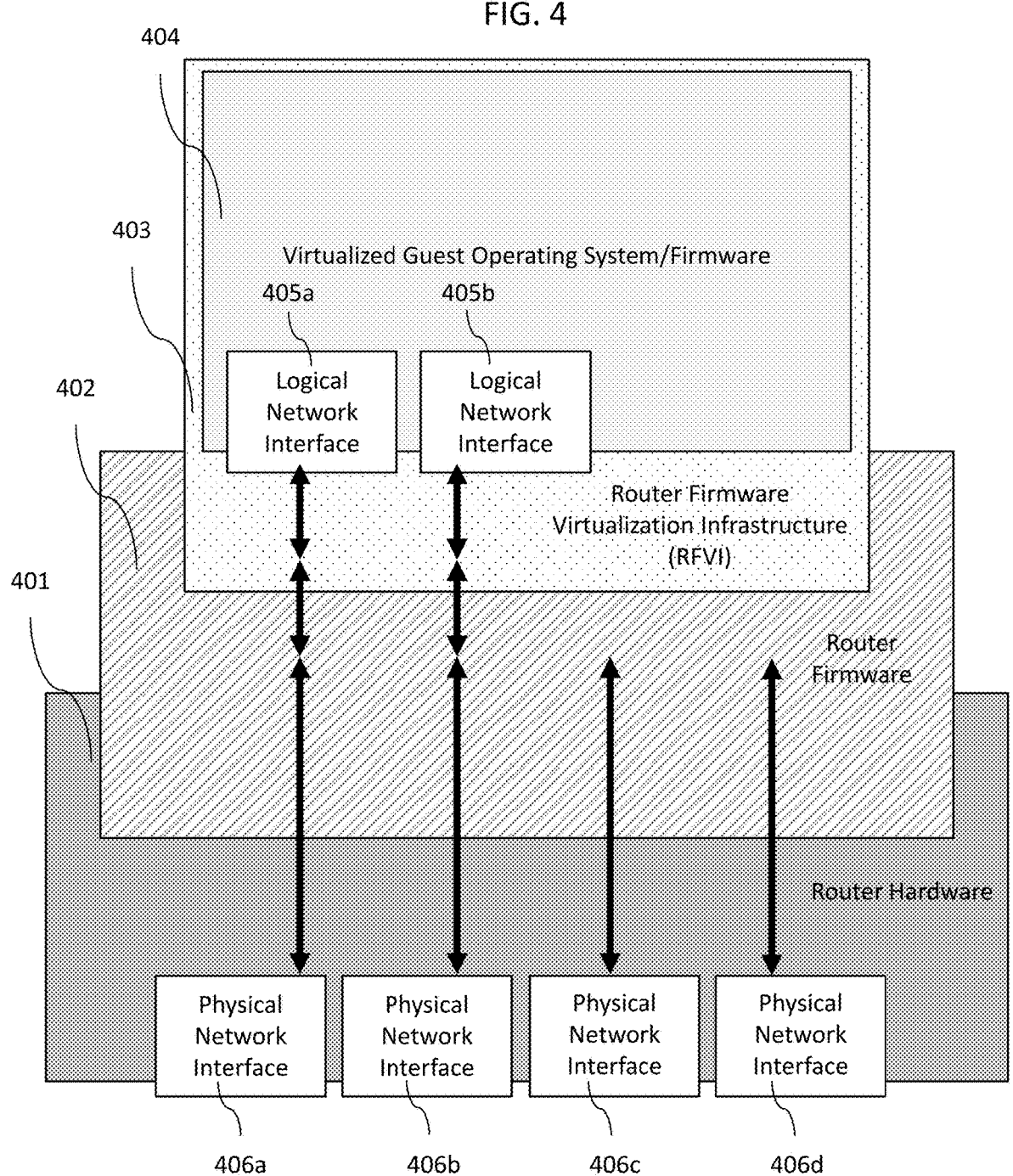
FIG. 4 shows a high level diagram of an example router configuration.

FIG. 4 shows a high level diagram of an example router configuration. In one embodiment the physical interface may be a Physical Network Interface (PNI) 406, which is a wired and/or wireless port such as those described herein. The logical interface may be a virtualized network interface, also known as a Logical Network Interface (LNI) 405, which may simulate a wired or wireless network port such as any of those described herein. The PNI 406 may be used by the RFVI 403 via the router firmware 402 to facilitate a connection to the LNI 405.

Figure 5:
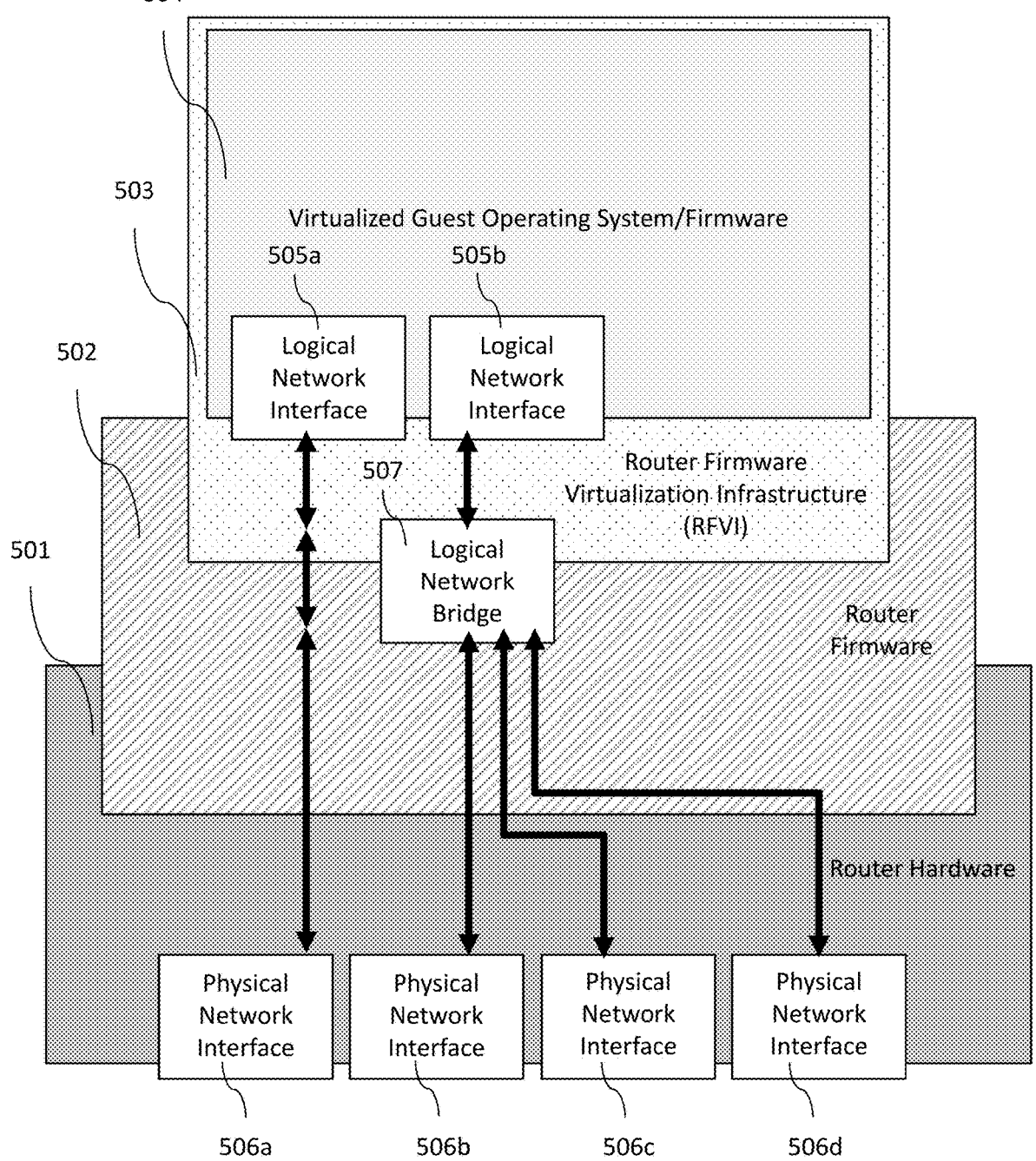
FIG. 5 shows a high level diagram of an example router configuration.

FIG. 5 shows a high level diagram of an example router configuration. In one embodiment the virtual machine 504 communicates with the PNI 506. The operating system of the virtual machine 504 may see a LNI 505 and treat is as a PNI 506 without knowing that it is virtualized. The RFVI 503 may also have a Logical Network Bridge (LNB) 507 that bridges one or more connections within the router 501. The RFVI 503 may be configured to have a static mapping of a specific LNI 505 to a specific PNI 506 and/or may have a dynamic mapping of one or more LNIs 505 to one or more PNIs 506. The routing of information from the ports of the PNI 506 and/or LNI 505 may happen simultaneously or near simultaneously.

The router 101 may implement directly and/or indirectly various levels of security. The router 101 may be used in a Commercial Solutions for Classified (CSfC) program as instituted by the National Security Agency (NSA). CSfC provides secure solutions leveraging layered encryption solutions to provide adequate protection of classified data. The router 101 may be used as, in conjunction with, or may assist with various processing functionality, such as: IPsec Virtual Private Network (VPN) Gateway, IPsec VPN Gateway, WLAN Access System, Certificate Authority, IPSec VPN Client, Wireless Local Area Network (WLAN) Client, Session Initiation Protocol (SIP) Server, Mobile Platform, Mobile Device Management (MDM), Software Full Drive Encryption (SW FDE), Hardware Full Drive Encryption, VoIP Applications, Transport Layer Security (TLS) Software Applications; E-mail Clients; Internet Protocol Security (IPS), Traffic Filtering Firewall, Web Browsers, File Encryption, TLS Protected Servers, Session Border Controller, Authentication Server, Medium Access Control Security (MACSEC) Ethernet Encryption Devices, and/or Virtualized Servers.

In one example scenario a first person may need to send classified or sensitive information to a second person at a location remote from the first person. The first person may connect their laptop to a router that may run a first IPSEC VPN alongside a second virtualized IPSEC VPN which may be connected via the internet to a second router at the second person's location. Each router thereby provides two functions (i.e., two layers of encryption/tunneling) in one device that reduces costs and increases efficiency of a one device solution for each person. In this example the first IPSEC VPN may be mapped to a first set of networking ports of a PNI of the router and the second virtualized IPSEC VPN may be mapped to a second set of networking ports of the PNI of the router. The first person's laptop may send information to the first set of networking ports where the information may be encrypted by the first IPSEC VPN. The information may then be sent to the second virtualized IPSEC VPN at a logical network interface of the virtualized IPSEC VPN and encrypted again, providing two layers of encryption, and then sent via the internet connection at the second set of networking ports of the router. The doubly encrypted information may travel in the open on the internet to the second person's router. A similar setup may exist at the second person's location, and the information may be received and processed, except in reverse, at the second person's router in order for the second person to receive the information securely from the first person.

In another example scenario, a router may run ordinary routing services as well as host software to facilitate network access to an eNodeB (eNB) that results in two functionalities in one hardware solution that provides network access to an eNodeB. In this way, a first person with a smartphone may connect to and send data to the virtualized eNB, where the data would then be sent through the router and possibly encrypted, and then sent via the internet to a second person or some other destination. The first person benefits from this by having a two function device within one enclosure thereby decreasing the networking communication hardware that has to be transported in order to achieve the networking/communication objectives of the first person.

The above examples are not meant to be limiting, but rather illustrative of the potential for the use of a routing system as described herein. Other examples may use any combination of two or more functionalities as disclosed herein, with the connections being facilitated by an internal communication configuration such as those shown in FIG. 2, 3, 4, or 5.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A processor in association with software may be used to implement a radio frequency transceiver for use in any computing device as discussed herein. Further, any features or elements discussing the sending of information may also apply to a request for information and handled in the same manner as discussed herein.

What is claimed is:

1. A router comprising:
    a physical network interface including a first set of network ports and a second set of network ports;
    a logical interface mapped to the physical network interface including a first set of logical ports and a second set of logical ports;
    memory;
    a processor operatively connected to the memory and the physical network interface, the processor and memory configured to run a first virtual machine, wherein the first virtual machine is configured to establish a first IP security (IPSEC) Virtual Private Network (VPN) and receive data from an external source at the first set of network ports, apply a first encryption to the data to generate one layer encrypted data, and send the one layer encrypted data to the logical interface at the first set of logical ports; and
    the processor and memory are further configured to run a second virtual machine with the logical network interface, wherein the second virtual machine is configured to establish a second IPSEC VPN and receive the encrypted data at the first set of logical ports, apply a second encryption to the one layer encrypted data to generate two layer encrypted data, and send the two layer encrypted data from the second set of logical ports to the second set of network ports.

2. The router of claim 1, wherein the processor and memory are further configured to run Router Firmware Virtualization Infrastructure (RFVI) for the virtual machine.

3. The router of claim 1, wherein the router is connected to the internet via the second set of network ports.

4. The router of claim 2, wherein the router is connected at the first set of network ports to one of a computer, a laptop, a tablet, a cell phone, or a cellular base station.

5. The router of claim 1, wherein the mapping is static or dynamic.

6. The router of claim 1, wherein the virtual machine implements a virtual server or router to control the sending and receiving of the data.

7. A method for a router, comprising:
receiving data at a first set of network ports of a physical network interface of the router;
processing the data by a first virtual machine run by the router, wherein the processing by the first virtual machine comprises applying a first layer of encryption to the data to generate one layer encrypted data;
forwarding the one layer encrypted data to a first port of a logical interface of a second virtual machine run by the router;
processing the one layer encrypted data by the second virtual machine, wherein the processing by the second virtual machine comprises applying a second encryption to the one layer encrypted data to generate two layer encrypted data;
sending the two layer encrypted data from a second port of the logical interface to a second network port of the physical network interface.

8. The method of claim 7, wherein the router is connected to the internet via the second set of network ports.

9. The method of claim 7, wherein the router is connected at the first set of network ports to one of a computer, a laptop, a tablet, a cell phone, or a cellular base station.

10. The method of claim 7, wherein the mapping is static or dynamic.

11. The method of claim 7, wherein the virtual machine implements a virtual server or router to control the sending and receiving of the data.

12. The router of claim 1, wherein the first network port is a wireless interface comprising of a cellular radio or a Wi-Fi radio.

13. The method of claim 7, wherein the first network port is a wireless interface comprising of a cellular radio or a Wi-Fi radio.

14. The router of claim 1, wherein the encrypted memory is hardware encrypted.

15. The router of claim 1, wherein the encrypted memory is software encrypted.

16. A router comprising:
a plurality of physical network ports;
a plurality of logical network ports dynamically mapped to the plurality of physical network ports;
encrypted memory;
a processor operatively connected to the encrypted memory and the plurality of physical network ports, the processor and encrypted memory configured to operate firmware configured to run a virtual machine;
the virtual machine is configured to receive data from an external source at a physical network port of the plurality of physical network ports and forward the data to a first logical network port of the plurality of logical network ports;
the virtual machine is further configured to run a plurality of virtual functions, wherein a first virtual function is configured to receive and apply a first encryption to the data to generate one layer encrypted data, and send the one layer encrypted data to the first logical network port;
the virtual machine further configured to bridge the first logical network port to a second logical network port of a second virtual function, the second virtual function configured to receive the one layer encrypted data and apply a second encryption to the one layer encrypted data to generate two layer encrypted data; and
the virtual machine further configure to forward the two layer encrypted data from the second logical network port to a second physical network port or another virtual machine logical port.

17. The router of claim 16, wherein the first physical network port is attached to a public internet connection and the second physical network port is a Wi-Fi radio.

18. The router of claim 16, wherein the first physical network port is a cellular radio and the second physical network port is a Wi-Fi radio.

19. The router of claim 16, wherein the first virtual machine or the second virtual machine is a firewall.

* * * * *